US012640792B2

(12) United States Patent
Park et al.

(10) Patent No.: US 12,640,792 B2
(45) Date of Patent: May 26, 2026

(54) JOINT DESIGN OF USER ASSOCIATION AND HYBRID BEAMFORMING METHOD AND SYSTEM FOR SUB-THz UDN USING MULTI-AGENT DEEP REINFORCEMENT LEARNING

(71) Applicant: Korea Advanced Institute of Science and Technology, Daejeon (KR)

(72) Inventors: Hyuncheol Park, Daejeon (KR); Seunghun Lee, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 378 days.

(21) Appl. No.: 18/343,546

(22) Filed: Jun. 28, 2023

(65) Prior Publication Data
US 2024/0204843 A1     Jun. 20, 2024

(30) Foreign Application Priority Data
Dec. 15, 2022     (KR) ........................ 10-2022-0175665

(51) Int. Cl.
*H04B 7/06*          (2006.01)
*H04B 7/0452*        (2017.01)
*H04B 17/336*        (2015.01)

(52) U.S. Cl.
CPC ......... *H04B 7/0626* (2013.01); *H04B 7/0452* (2013.01); *H04B 17/336* (2015.01)

(58) Field of Classification Search
CPC ... H04B 7/0626; H04B 7/0452; H04B 17/336
See application file for complete search history.

(56) References Cited

U.S. PATENT DOCUMENTS

| | | | | |
|---|---|---|---|---|
| 11,522,593 B1 * | 12/2022 | Fan | ...................... | H04B 7/0617 |
| 12,328,165 B2 * | 6/2025 | Zhu | ...................... | H04B 7/0452 |

(Continued)

FOREIGN PATENT DOCUMENTS

| | | |
|---|---|---|
| KR | 10-1900607 | 9/2018 |
| KR | 10-2168650 | 10/2020 |

OTHER PUBLICATIONS

Mismar et al.; "Deep Reinforcement Learning for 5G Networks: Joint Beamforming, Power Control, and Interference Coordination"; IEEE Transactions on Communications; vol. 68 No. 3; Mar. 2020; p. 1581-1592.

(Continued)

*Primary Examiner* — Fahmida S Chowdhury
(74) *Attorney, Agent, or Firm* — BakerHostetler

(57) ABSTRACT

Disclosed is a method and system for interference control and hybrid beamforming using multi-agent deep reinforcement learning for multiple users. The disclosed method includes performing multi-agent reinforcement learning using interference and antenna gain information that is expected based on a gain table designed using channel state information (CSI) of all user equipments; searching for an analog beamforming matrix pair corresponding to a link that maximizes antenna gain and minimizes interference between user equipments through multi-agent reinforcement learning; applying a signal-to-leakage plus noise ratio (SLNR) maximization technique that minimizes the interference between the user equipments based on the link; and optimizing transmission (Tx) power for each link based on iterative water-filling.

15 Claims, 5 Drawing Sheets

(56)                    References Cited

U.S. PATENT DOCUMENTS

| | | | | |
|---|---|---|---|---|
| 2005/0101259 | A1* | 5/2005 | Tong | H04B 7/0626 455/500 |
| 2006/0098754 | A1* | 5/2006 | Kim | H04B 7/0426 375/267 |
| 2009/0253380 | A1* | 10/2009 | Ko | H04B 7/0639 455/68 |
| 2010/0303170 | A1* | 12/2010 | Zhu | H04B 7/0417 375/295 |
| 2011/0176633 | A1* | 7/2011 | Ojard | H04B 7/0617 375/295 |
| 2013/0102243 | A1* | 4/2013 | Gunnarsson | H04W 16/28 455/501 |
| 2014/0086086 | A1* | 3/2014 | Zhang | H04B 7/0452 370/252 |
| 2014/0307664 | A1* | 10/2014 | Chen | H04B 7/0865 370/329 |
| 2014/0369219 | A1* | 12/2014 | Wang | H04L 1/20 370/252 |
| 2015/0200718 | A1* | 7/2015 | Sajadieh | H04W 28/02 375/267 |
| 2015/0365957 | A1* | 12/2015 | Zhu | H04W 72/541 370/280 |
| 2015/0372726 | A1* | 12/2015 | Cheong | H04B 7/0452 375/267 |
| 2016/0261327 | A1* | 9/2016 | Merlin | H04L 5/0057 |
| 2016/0262050 | A1* | 9/2016 | Merlin | H04L 1/0026 |
| 2016/0262051 | A1* | 9/2016 | Merlin | H04B 7/0626 |
| 2017/0118688 | A1* | 4/2017 | Guvenc | H04W 36/20 |
| 2017/0142734 | A1* | 5/2017 | Jwa | H04B 7/0617 |
| 2017/0195026 | A1* | 7/2017 | Ghosh | H04B 7/0617 |
| 2018/0227022 | A1* | 8/2018 | Kim | H04B 7/0478 |
| 2018/0227037 | A1* | 8/2018 | Ahmed Ouameur | H04B 7/0854 |
| 2018/0269939 | A1* | 9/2018 | Hu | H04B 7/0456 |
| 2019/0109629 | A1* | 4/2019 | Park | H04B 7/0868 |
| 2019/0190569 | A1* | 6/2019 | Nayeb Nazar | H04B 7/0639 |
| 2020/0304177 | A1* | 9/2020 | Song | H04B 7/0456 |
| 2020/0382188 | A1* | 12/2020 | Stephenne | H04L 5/14 |
| 2020/0404664 | A1* | 12/2020 | Chae | H04L 5/1423 |
| 2022/0078626 | A1* | 3/2022 | Doshi | G06N 3/09 |
| 2022/0200678 | A1* | 6/2022 | Ciochina | H04B 7/0626 |
| 2024/0022950 | A1* | 1/2024 | Bouton | H04W 28/0247 |
| 2024/0088959 | A1* | 3/2024 | Lee | G06N 3/092 |
| 2024/0107429 | A1* | 3/2024 | Challita | G06N 3/096 |
| 2024/0204830 | A1* | 6/2024 | Pjanic | H04L 25/03891 |
| 2024/0204843 | A1* | 6/2024 | Park | H04B 7/0617 |

OTHER PUBLICATIONS

Ge et al.; "Deep Reinforcement Learning for Distributed Dynamic MISO Downlink-Beamforming Coordination"; IEEE Transactions on Communications; vol. 68 No. 10; Oct. 2020; p. 6070-6085.

Kwon et al.; "Joint User Association and Beamforming Design for Millimeter Wave UDN With Wireless Backhaul"; IEEE Journal on Selected Areas in Communications; vol. 37 No. 12; Dec. 2019; p. 2653-2668.

* cited by examiner

MBS(Macro Base Station)(110)

(133)

SBS(Small Base Station)
(Antenna element : N )
(131)

UE(User Equipment)(121)
(Antenna element : N$_U$)

(122)

(132)

- - - - - - - - - -  : Access link(140)

─────────  : Feedback link(150)

FIG. 3

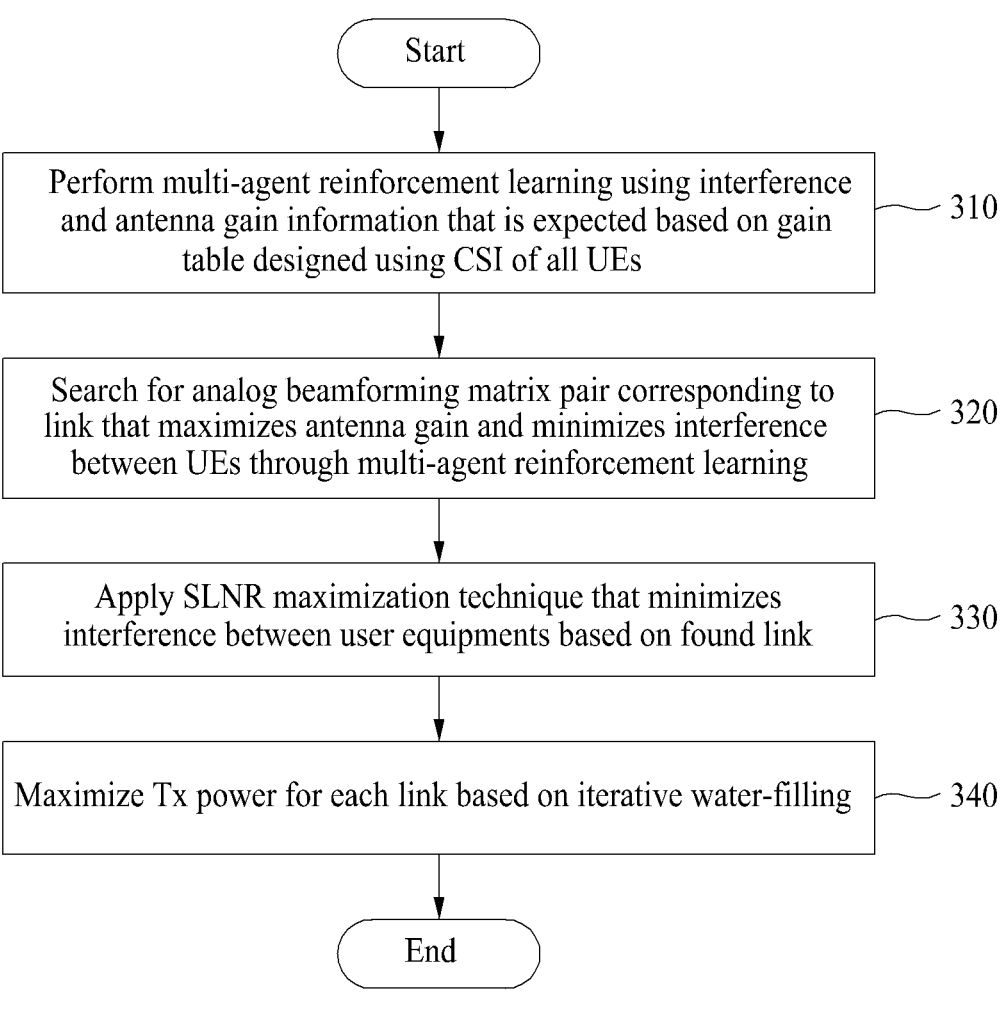

Start

Perform multi-agent reinforcement learning using interference and antenna gain information that is expected based on gain table designed using CSI of all UEs ⟋ 310

Search for analog beamforming matrix pair corresponding to link that maximizes antenna gain and minimizes interference between UEs through multi-agent reinforcement learning ⟋ 320

Apply SLNR maximization technique that minimizes interference between user equipments based on found link ⟋ 330

Maximize Tx power for each link based on iterative water-filling ⟋ 340

End

FIG. 4

JOINT DESIGN OF USER ASSOCIATION AND HYBRID BEAMFORMING METHOD AND SYSTEM FOR SUB-THz UDN USING MULTI-AGENT DEEP REINFORCEMENT LEARNING

CROSS-REFERENCE TO RELATED APPLICATION(S)

This application claims the priority benefit of Korean Patent Application No. 10-2022-0175665, filed on Dec. 15, 2022, in the Korean Intellectual Property Office, the disclosure of which is incorporated herein by reference.

BACKGROUND

Field of the Invention

Example embodiments relate to a method and system for interference control and hybrid beamforming using multi-agent deep reinforcement learning for multiple users.

Description of the Related Art

Beamforming technology refers to technology for generating transmission/reception signals having directivity using a plurality of antennas. In 5G and beyond 5G systems, a high level of path attenuation may be experienced due to an ultra-high frequency channel being applied, but a signal with a short wavelength may be transmitted due to a very high channel frequency. Therefore, if a narrow beam is formed by designing a plurality of high-density antennas with very narrow antenna spacing and by applying beamforming technology, path attenuation may be overcome.

In the case of applying the existing digital antenna-based beamforming technology using a plurality of antennas, the number of radio frequency (RF) chains corresponding to the number of antennas are required, which leads to high hardware complexity and power consumption. To overcome this, great attention is being paid to hybrid beamforming technology for employing a narrow analog beam pattern using a plurality of antennas while applying the number of RF chains much less than the number of antennas.

Hybrid beamforming may simultaneously obtain spatial multiplexing gain of digital beamforming and antenna beamforming gain of analog beamforming. An analog beamforming block includes only a phase shifter to reduce circuit complexity.

To obtain a high data rate, a wide bandwidth needs to be secured. Here, the wide bandwidth may be secured by using an ultra-high frequency channel, such as sub-tera hertz (sub-THz) that considers a beyond 5G mobile communication system. However, a high frequency channel has high path attenuation and, in the case of using the high frequency channel, there is no way but to transmit a signal with narrow coverage. Therefore, a high data rate may be obtained by configuring a concentrated, that is, high-density network in a narrow space.

The existing base station-centric network may have a low degree of freedom in terms of optimizing a data rate since a user may transmit and receive signals to and from a single base station. However, in a user-centric network, each user may be connected to a plurality of base stations and may connect to the number of base stations corresponding to a maximum number of radio frequency (RF) chains. Through this, a network that achieves an optimal transmission rate may be designed based on a high degree of freedom.

In the related art [1], interference and power were controlled by applying a single-agent deep reinforcement learning technique not using channel information. However, since the single-agent-based deep reinforcement learning technique is applied, application becomes difficult if the number of base stations and the number of users within a high-density network increase. Also, since a single antenna system is applied to a user, space multiplexing may not be obtained. Unlike this, the present invention may improve power efficiency and obtain a high data rate by introducing a multi-agent deep reinforcement learning technique for multiple users and a hybrid beamformer technique using the same.

In the related art [2], beamforming interference between users is controlled by applying a multi-agent deep reinforcement learning technique using channel information. However, similar to the related art [1], since a single antenna system is applied to a user, spatial multiplexing gain may not be obtained. Also, since a hybrid beamforming system is not applied, it is difficult to apply to a plurality of antenna systems and to obtain a high data rate and a maximum transmission speed per unit area.

In the related art [3], proposed is a technique for greedily selecting a beam pair having a high channel coefficient based on a hybrid beamforming system using limited channel information. However, since beam pairs are greedily selected without applying artificial intelligence technology, it is difficult to optimally control residual interference between users and accordingly, it is difficult to obtain an optimal data rate.

In the related art, to reduce a complexity issue, not a plurality of base stations but a single base station is assumed or beamforming is designed for a user based on a single antenna. In the case of considering only interference between users for a single base station, interference caused by beams from other base stations may not be controlled with the corresponding technology. Also, in the case of considering only a user based on a single antenna, multiplexing gain for each RF chain may not be obtained since only a single RF chain is available.

In the related art [4], a vector quantization module that quantizes vector channels by dividing the vector channels into a real part and an imaginary part is applied to obtain an optimal beamforming vector using machine learning. The quantized vector channels are reassembled into a codeword of a beamforming vector. This method may easily obtain a beamforming vector from a channel in a form of a vector. However, in the case of a matrix having a dimension of a multiple input multiple output (MIMO) channel greater than or equal to 2, it is difficult to process an input after vectorization due to channel sparsity and correlation. Also, if a channel in a corresponding form is vectorized and divided into a real part and an imaginary part, a length of a vector that is input to a neural network significantly increases, which leads to enlarging a size of the neural network and making it difficult to handle all parameters of a high-density network. Also, since a user with a single antenna is assumed, multiplexing gain for each RF chain may not be obtained.

In the related art [5], proposed is a user scheduling method for allocating power and transmitting a signal to at least one user in a multi-antenna downlink system. Due to a plurality of antennas, the corresponding art may obtain multiplexing gain for each RF chain. However, since a single base station rather than a plurality of base stations is assumed and the plurality of base stations does not perform cooperative transmission, it may be difficult to improve a data rate according to an increase in the number of base stations.

Non-patent documents are as follows:

[1] F. B. Mismar, B. L. Evans and A. Alkhateeb, "Deep reinforcement learning for 5G networks: Joint beamforming power control and interference coordination", *IEEE Trans. Commun.*, vol. 68, no. 3, pp. 1581-1592, March 2020.

[2] J. Ge, Y.-C. Liang, J. Joung and S. Sun, "Deep reinforcement learning for distributed dynamic MISO downlink-beamforming coordination", *IEEE Trans. Commun.*, vol. 68, no. 10, pp. 6070-6085, October 2020.

[3] G. Kwon and H. Park, "Joint user association and beamforming design for millimeter wave UDN with wireless backhaul", *IEEE J. Sel. Areas Commun.*, vol. 37, no. 12, pp. 2653-2668, December 2019.

Patent documents are as follows:

[4] Korean Patent Registration No. 10-2168650 (2020 Oct. 15)

[5] Korean Patent Registration No. 10-1900607 (2018 Sep. 13)

SUMMARY

Example embodiments provide a method and system for interference control and hybrid beamforming using multi-agent deep reinforcement learning for multiple users for solving such issues since it is impossible to obtain a numerically optimal solution due to presence of various interference, such as interference between base stations and interference between beams, in a mobile communication environment in which a plurality of base stations and a plurality of users are present and existing machine learning is unavailable due to absence of a label for learning.

In detail, example embodiments propose an efficient interference control through multi-agent deep reinforcement learning of increasing power efficiency and obtaining a high data rate by introducing a multi-agent deep reinforcement learning technique for multiple users and a hybrid beamformer technique using the same and operating in a user-centric network in which a plurality of base stations in a more complex form may support a single user.

According to an aspect of at least one example embodiment, there is provided an interference control and hybrid beamforming method using multi-agent deep reinforcement learning for multiple users, including performing multi-agent reinforcement learning using interference and antenna gain information that is expected based on a gain table designed using channel state information (CSI) of all user equipments; searching for an analog beamforming matrix pair corresponding to a link that maximizes antenna gain and minimizes interference between user equipments through multi-agent reinforcement learning; applying a signal-to-leakage plus noise ratio (SLNR) maximization technique that minimizes the interference between the user equipments based on the link; and optimizing transmission (Tx) power for each link based on iterative water-filling.

The performing of the multi-agent reinforcement learning using the interference and antenna gain information may include designing, as a reward of each agent, a signal-to-interference plus noise ratio (SINR) for each small base station (SMS) that is predicted based on interference and antenna gain that is expected in a process of the multi-agent reinforcement learning performed for a plurality of agents corresponding to each SBS for the multi-agent reinforcement learning.

The performing of the multi-agent reinforcement learning using the interference and antenna gain information may include learning a link configuration that maximizes a data rate through a trial-and-error method from a predetermined number of episodes and time intervals within the episodes for all agents.

The searching for the analog beamforming matrix pair may include defining a link selected so far from a candidate link set as a state of a corresponding agent for each agent, defining a link selected in a current time interval, as an action of the agent, and defining a sum of data rates obtained from links selected so far of an SBS related to the agent in a corresponding time interval for each agent as a reward of the agent.

The searching for the analog beamforming matrix pair may include searching for a link between the SBS and the user equipment that minimizes interference for the selected links and maximizes antenna gain by constructing the state of the agent and the action of the agent as a binary vector.

The applying of the SLNR maximization technique may include allowing each SBS to apply a hybrid beamforming matrix and allowing the user equipment to apply an analog beamforming matrix to which baseband beamforming is not applied, and, when a plurality of SBSs simultaneously transmit signals to user equipments of links connected to the plurality of SBSs, obtaining a sum of data rates of the entire network based on an SINR of all links according to interference between links connected to the user equipment, interference between the user equipment and another user equipment that occurs by opening, by an SBS connected to the user equipment, a link with the other user equipment and by transmitting a stream, and interference from other SBSs, and optimizing a beamforming matrix pair and a link configuration between the SBS and the user equipment for data rate maximization using the sum of data rates.

The applying of the SLNR maximization technique may include reducing signal overhead through limited CSI obtainment by transmitting a portion of the entire channels according to channel gain between an SBS and the user equipment and by using an index of the link as an index within a pre-input prior matrix of an analog beamformer to prevent signal overhead for a macro base station (MBS) in an ultra massive multiple input multiple output (UM-MIMO) network.

The applying of the SLNR maximization technique may further include allowing a plurality of agents present in the MBS to simultaneously perform learning with other agents within a virtual network that is designed based on a gain table of the MBS; and selecting a plurality of candidate links within each agent and when links with matching rows or columns in the gain table are present among candidate links selected by each of the agents, selecting a link having largest channel gain information and unselecting remaining candidate links from among candidate links selected by each agent within the gain table of the MBS.

The multi-agent reinforcement learning may be capable of outputting a beam according to a change in a communication environment or a change in channel input by immediately designing beams between a plurality of SBSs and a plurality of user equipments using online reinforcement learning.

The multi-agent reinforcement learning may assume a plurality of SBSs of which locations are not fixed in a UM-MIMO network and may increase a degree of freedom and efficiency of the multi-agent reinforcement learning by simultaneously learning beams by allowing a plurality of SBSs to correspond to the plurality of agents.

According to another aspect of at least one example embodiment, there is provided an interference control and hybrid beamforming system using multi-agent deep reinforcement learning for multiple users, including a learning unit configured to perform multi-agent reinforcement learning using interference and antenna gain information that is expected based on a gain table designed using CSI of all user equipments; and an interference control and beamforming performer configured to search for an analog beamforming matrix pair corresponding to a link that maximizes antenna gain and minimizes interference between user equipments through multi-agent reinforcement learning, to apply an SLNR maximization technique that minimizes the interference between the user equipments based on the link, and to optimize transmission (Tx) power for each link based on iterative water-filling.

According to some example embodiments, it may apply to a high-density network system with a radius of several tens of meters in sub-tera hertz (THz) band that is key technology and task of 5G and beyond 5G mobile communication systems. Sub-THZ communication technology is currently gaining great attention from academic and industrial fields with ultra-massive MIMO technology. In particular, example embodiments may achieve a high maximum transmission speed per unit area that meets requirements of the 5G and beyond 5G mobile communication systems and may expect high marketability accordingly. Also, by effectively controlling interference of a high-density network system through multi-agent deep reinforcement learning, it is possible to achieve a high data rate and a maximum transmission speed per unit area that has not been achieved in the related art. In addition, while artificial intelligence technology-based communication systems are expected to represent beyond 5G mobile communication technology market in the future, multi-agent deep reinforcement learning has advantages distinguished from AI technology actively used in the past and high technological advantage and market leadership may be expected.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIG. 3 is a flowchart illustrating an interference control and hybrid beamforming method using multi-agent deep reinforcement learning for multiple users according to an example embodiment;

FIG. 4 illustrates an interference control and hybrid beamforming process using multi-agent deep reinforcement learning according to an example embodiment.

DETAILED DESCRIPTION

Hereinafter, example embodiments will be described with reference to the accompanying drawings.

Figure 1:
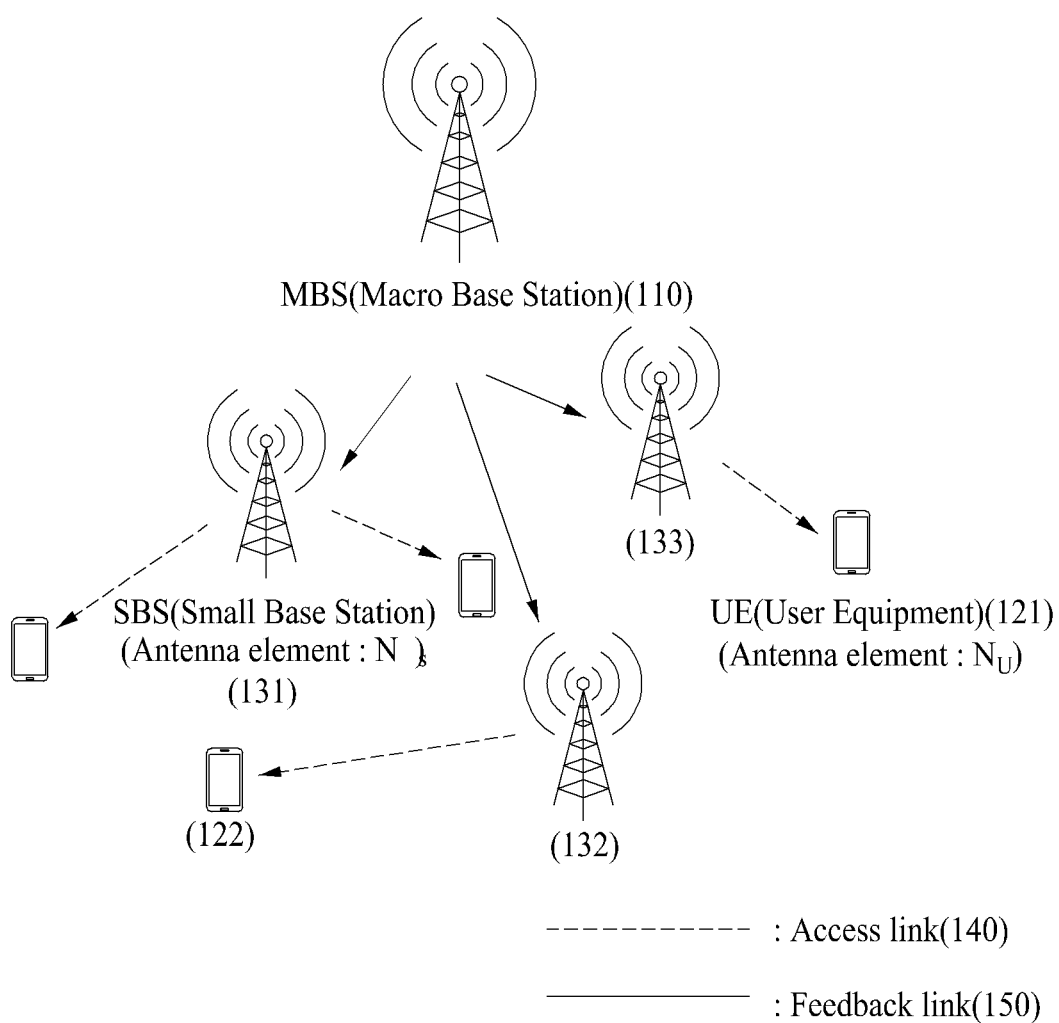
FIG. 1 illustrates a user-centric network model using ultra-massive multiple input multiple output (UM-MIMO) according to an example embodiment.

FIG. 1 illustrates a user-centric network model using ultra-massive multiple input multiple output (UM-MIMO) according to an example embodiment.

Reinforcement learning has been noted as a very efficient artificial intelligent (AI) technique in predetermine scale of decision-making scenarios. However, in reality, there are a large number of variables that affect scenarios and deep reinforcement learning is proposed to handle large-scale scenarios that reflect the variables.

Deep reinforcement learning may efficiently find an optimal policy for maximizing reward of a scenario using interaction between objects called agents and a deep neural network.

In the past, single-agent deep reinforcement learning has been studied a lot, but this learning has a difficulty in suppressing the number of cases of states and actions that explosively increase with respect to the increasing number of variables. Also, unlike what is assumed in single-agent deep reinforcement learning, information sharing may be limited due to constraints between an agent and an environment in a real environment and a plurality of agents may be required.

To overcome this, multi-agent deep reinforcement learning is proposed and this learning allows a plurality of agents to design a scalable scenario through interaction with an environment in a scenario.

Referring to FIG. 1, proposed is an interference control method using multi-agent deep reinforcement learning for multiple users, for example, a user equipment (UE) 121 and a UE 122 in a user-centric network model based on a macro base station (MBS) 110 using UM-MIMO.

In a high-density network in a high frequency band, inter-user interference needs to be removed to obtain a high data rate. In particular, in the case of applying beamforming using a plurality of antennas between each base station and each user, interference may be controlled while the base stations and the users simultaneously form links. However, in this case, since complexity of the interference control method significantly increases, the existing optimization technique may not efficiently remove interference.

So far, a method of decreasing complexity by approximating the existing issue and single-agent deep reinforcement learning showing high efficiency when the number of users is small have been applied. If the number of users in the network increases, a size of a deep neural network increases, which makes single-agent deep reinforcement learning impossible.

In the case of simultaneously training corresponding agents by introducing multi-agent deep reinforcement learning and also introducing the number of agents corresponding to the number of small base stations (SBSs) 131, 132, and 133 each in charge of connection of links, for example, an access link 140) and a feedback link 150, in the network, complexity may be significantly reduced compared to the aforementioned single-agent deep reinforcement learning and a high data rate may be achieved through efficient interference removal compared to the existing optimization technique.

In the existing art, beamforming for a single antenna-based user is applied or a multi-user-based beamforming system is designed based on sub-optimal interference control without using AI technology. Alternatively, a system for transmitting and receiving signals only in a limited cell area to suppress interference is proposed. However, example embodiments may achieve a high data rate by efficiently removing interference of beamforming for multi-antenna-based users using limited channel information.

Also, unlike the existing single-agent deep reinforcement learning-based or a system designed for a single-antenna-based user, the example embodiments may design an AI-based hybrid beamforming system available regardless of an increase in the number of base stations and users through a hybrid beamforming system based on a multi-agent deep reinforcement learning system for a multi-antenna-based user system showing high complexity.

Figure 2:
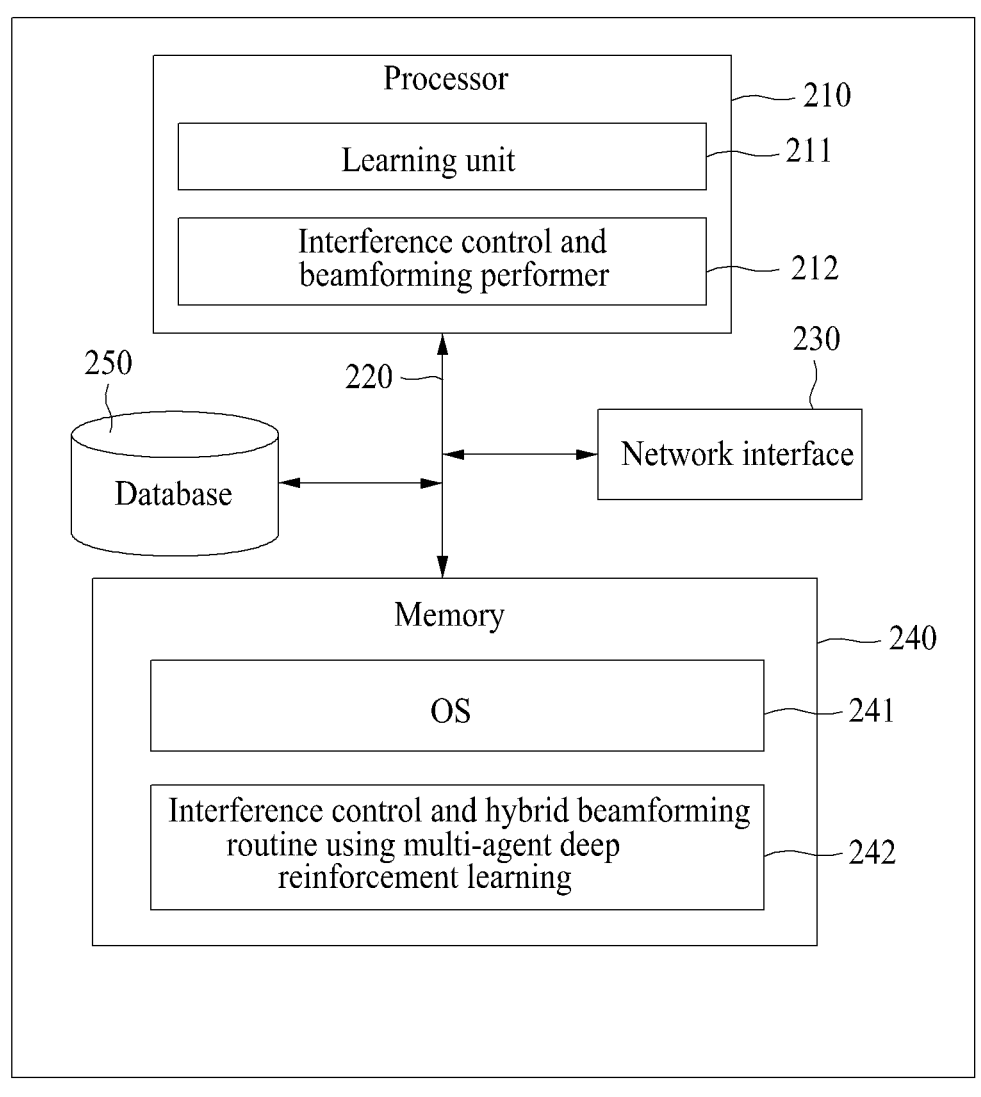
FIG. 2 is a diagram illustrating a configuration of an interference control and hybrid beamforming system using multi-agent deep reinforcement learning for multiple users according to an example embodiment.

FIG. 2 is a diagram illustrating a configuration of an interference control and hybrid beamforming system using multi-agent deep reinforcement learning for multiple users according to an example embodiment.

Referring to FIG. 2, an interference control and hybrid beamforming system 200 according to an example embodiment may include a processor 210, a bus 220, a network interface 230, a memory 240, and a database 250. The memory 240 may include an operating system (OS) 241 and an interference control and hybrid beamforming routine 242 using multi-agent deep reinforcement learning for multiple users. The processor 210 may include a learning unit 211 and an interference control and beamforming performer 212. According to other example embodiments, the interference control and hybrid beamforming system 200 may include the number of components greater than the number of components of FIG. 2. However, there is no need to clearly illustrate many conventional components. For example, the interference control and hybrid beamforming system 200 may include other components, such as a display or a transceiver.

The memory 240 may include a permanent mass storage device, such as random access memory (RAM), read only memory (ROM), and a disk drive, as a computer-readable recording medium. Also, the memory 240 may store program codes for the OS 241 and the interference control and hybrid beamforming routine 242 using multi-user multi-agent deep reinforcement learning for multiple users. Such software components may be loaded from another computer-readable recording medium separate from the memory 240 using a drive mechanism (not shown). The other computer-readable recording medium may include a computer-readable recording medium (not shown), for example, a floppy drive, a disk, a tape, a DVD/CD-ROM drive, a memory card, and the like. According to other example embodiments, software components may be loaded to the memory 240 through the network interface 230, not the computer-readable recording medium.

The bus 220 enables communication and data transmission between components of the interference control and hybrid beamforming system 200. The bus 220 may be configured using a high-speed serial bus, a parallel bus, storage area network (SAN), and/or other appropriate communication technology.

The network interface 230 may be a computer hardware component for connecting the interference control and hybrid beamforming system 200 to a computer network. The network interface 230 may connect the interference control and hybrid beamforming system 200 to the computer network through wireless or wired connection.

The database 250) may serve to store and maintain all information required for interference control and hybrid beamforming using multi-agent deep reinforcement learning for multiple users. Although FIG. 2 illustrates that the database 250 is constructed and included in the interference control and hybrid beamforming system 200, it is provided as an example only. The database 200 may be omitted depending on a system implementation method or environment or the entire database or a portion thereof may be present as an external database constructed on a separate system.

The processor 210 may be configured to process instructions of a computer program by performing basic arithmetic operations, logic operations, and I/O operations of the interference control and hybrid beamforming system 200. The instructions may be provided from the memory 240) or the network interface 230 to the processor 210 through the bus 220. The processor 210 may be configured to execute a program code for the learning unit 211 and the interference control and beamforming performer 212. The program code may be stored in a storage device, such as the memory 240.

The learning unit 211 and the interference control and beamforming performer 212 may be configured to perform operations 310 to 340 of FIG. 3.

The interference control and hybrid beamforming system 200 may include the learning unit 211 and the interference control and beamforming performer 212.

The learning unit 211 according to an example embodiment performs multi-agent reinforcement learning using interference and antenna gain information that is expected based on a gain table designed using channel state information (CSI) of all UEs.

The learning unit 211 according to an example embodiment designs, as a reward for each agent, a signal-to-interference plus noise ratio (SINR) for each SMS that is predicted based on interference and antenna gain that is expected in a process of the multi-agent reinforcement learning performed for a plurality of agents corresponding to each SBS for the multi-agent reinforcement learning.

The learning unit 211 according to an example embodiment learns a link configuration that maximizes a data rate through a trial-and-error method from a predetermined number of episodes and time intervals within the episodes for all agents.

The interference control and beamforming performer 212 according to an example embodiment searches for an analog beamforming matrix pair corresponding to a link that maximizes antenna gain and minimizes interference between UEs through multi-agent reinforcement learning. The interference control and beamforming performer 212 applies a signal-to-leakage plus noise ratio (SLNR) maximization technique that minimizes the interference between the UEs based on the link and optimizes transmission (Tx) power for each link based on iterative water-filling.

The interference control and beamforming performer 212 according to an example embodiment defines a link selected so far from a candidate link set as a state of a corresponding agent for each agent, defines a link selected in a current time interval, as an action of the agent, and defines a sum of data rates obtained from links selected so far of an SBS related to the agent in a corresponding time interval for each agent as a reward of the agent.

The interference control and beamforming performer 212 according to an example embodiment searches for a link between the SBS and the UE that minimizes interference for the selected links and maximizes antenna gain by constructing the state of the agent and the action of the agent as a binary vector.

The interference control and beamforming performer 212 allows each SBS to apply a hybrid beamforming matrix and allows the UE to apply an analog beamforming matrix to which baseband beamforming is not applied. When a plurality of SBSs simultaneously transmit signals to UEs of links connected to the plurality of SBSs, the interference control and beamforming performer 212 obtains a sum of data rates of the entire network based on an SINR of all links according to interference between links connected to the UE, interference between the UE and another UE that occurs by opening, by an SBS connected to the UE, a link with the other UE and by transmitting a stream, and interference from other SBSs. The interference control and beamforming performer 212 optimizes a beamforming matrix pair and a link configuration between the SBS and the UE for data rate maximization using the sum of data rates.

The interference control and beamforming performer 212 according to an example embodiment may reduce signal overhead through limited CSI obtainment by transmitting only a portion of the entire channel according to channel gain between an SBS and the UE and by using an index of the link as an index within a pre-input prior matrix of an analog beamformer to prevent signal overhead for an MBS in a UM-MIMO network.

The interference control and beamforming performer 212 according to an example embodiment allows a plurality of agents present in the MBS to simultaneously perform learning with other agents within a virtual network that is designed based on a gain table of the MBS. The interference control and beamforming performer 212 selects a plurality of candidate links within each agent and when links with matching rows or columns in the gain table are present among candidate links selected by each of the agents, selects only a link having largest channel gain information and unselects remaining candidate links from among the candidate links selected by each agent within the gain table of the MBS.

The interference control and beamforming performer 212 according to an example embodiment may output a beam according to a change in a communication environment or a change in channel input by immediately designing beams between a plurality of SBSs and a plurality of UEs using online reinforcement learning. The interference control and beamforming performer 212 may assume a plurality of SBSs of which locations are not fixed in a UM-MIMO network and may increase a degree of freedom and efficiency of the multi-agent reinforcement learning by simultaneously learning beams by allowing a plurality of SBSs to correspond to the plurality of agents.

FIG. 3 is a flowchart illustrating an interference control and hybrid beamforming method using multi-agent deep reinforcement learning for multiple users according to an example embodiment.

The interference control and hybrid beamforming method using multi-agent deep reinforcement learning for multiple users proposed herein includes operation 310 of performing multi-agent reinforcement learning using interference and antenna gain information that is expected based on a gain table designed using CSI of all UEs; operation 320 of searching for an analog beamforming matrix pair corresponding to a link that maximizes antenna gain and minimizes interference between UEs through multi-agent reinforcement learning; operation 330 of applying an SLNR maximization technique that minimizes the interference between the UEs based on the link; and operation 340 of maximizing transmission (Tx) power for each link based on iterative water-filling.

In operation 310, multi-agent reinforcement learning is performed using interference and antenna gain information that is expected based on a gain table designed using CSI of all UEs.

An SINR for each SMS that is predicted based on interference and antenna gain that is expected in a process of the multi-agent reinforcement learning performed for a plurality of agents corresponding to each SBS for the multi-agent reinforcement learning is designed as a reward of each agent.

A link configuration that maximizes a data rate is learned through a trial-and-error method from a predetermined number of episodes and time intervals within the episodes for all agents.

In operation 320, an analog beamforming matrix pair corresponding to a link that maximizes antenna gain and minimizes interference between UEs through multi-agent reinforcement learning is searched for.

A link selected so far from a candidate link set is defined as a state of a corresponding agent for each agent, a link selected in a current time interval is defined as an action of the agent, and a sum of data rates obtained from links selected so far of an SBS related to the agent in a corresponding time interval for each agent is defined as a reward of the agent.

A link between the SBS and the UE that minimizes interference for the selected links and maximizes antenna gain is searched for by constructing the state of the agent and the action of the agent as a binary vector.

In operation 330, an SLNR maximization technique that minimizes the interference between the UEs based on the link is applied.

Each SBS applies a hybrid beamforming matrix and the UE applies an analog beamforming matrix to which baseband beamforming is not applied. When a plurality of SBSs simultaneously transmit signals to UEs of links connected to the plurality of SBSs, a sum of data rates of the entire network is obtained based on an SINR of all links according to interference between links connected to the UE, interference between the UE and another UE that occurs by opening, by an SBS connected to the UE, a link with the other UE and by transmitting a stream, and interference from other SBSs, and a beamforming matrix pair and a link configuration between the SBS and the UE for data rate maximization are optimized using the sum of data rates.

In operation 340, an SLNR maximization technique that minimizes the interference between the UEs based on the link is applied.

Signal overhead may be reduced through limited CSI obtainment by transmitting only a portion of the entire channels according to channel gain between an SBS and the UE and by using an index of the link as an index within a pre-input prior matrix of an analog beamformer to prevent signal overhead for an MBS in a UM-MIMO network.

A plurality of agents present in the MBS simultaneously perform learning with other agents within a virtual network that is designed based on a gain table of the MBS. A plurality of candidate links within each agent are selected and when links with matching rows or columns in the gain table are present among candidate links selected by each of the agents, only a link having largest channel gain information is selected and remaining candidate links are unselected from among candidate links selected by each agent within the gain table of the MBS.

The multi-agent reinforcement learning according to an example embodiment may output a beam according to a change in a communication environment or a change in channel input by immediately designing beams between a plurality of SBSs and a plurality of UEs using online reinforcement learning.

The multi-agent reinforcement learning according to an example embodiment may assume a plurality of SBSs of which locations are not fixed in a UM-MIMO network and may increase a degree of freedom and efficiency of the multi-agent reinforcement learning by simultaneously learning beams by allowing a plurality of SBSs to correspond to the plurality of agents.

As described above, according to an example embodiment, proposed is a multi-agent deep reinforcement learning-based system for maximizing a transmission rate per unit area in a mobile communication environment in which a plurality of base stations and a plurality of users are present.

According to an example embodiment, scalable multi-agent deep reinforcement learning capable of performing optimal resource allocation without using a label is performed in a mobile communication environment in which a plurality of base stations and a plurality of users are present.

According to an example embodiment, it is possible to efficiently distribute a beam pattern design between an SBS and a UE based on a UM-MIMO with high complexity and interference control of beams through multi-agent deep reinforcement learning, and based thereon, to be scalable and expandable to a high-density network including a plurality of base station and a plurality of users, which differs from an existing single-agent deep reinforcement learning-based method.

According to an example embodiment, although an optimal state may not be found with a high probability after a learning process, a sub-optimal state having a similar correlation may be found by applying a state and action structure configured as a binary vector that reduces training difficulty of deep reinforcement learning and by configuring a state and an action as the binary vector.

According to an example embodiment, a complex channel and hybrid beamform structure is simplified using an index and applied to a state and an action.

While the conventional machine learning technique that designs a channel and hybrid beamformer divides an element mostly including complex numbers into a real part and an imaginary part and inputs the same to a deep neural network, the example embodiment may reduce complex of a state and an action by inputting a prior matrix in advance and then defining a state and an action based on indices in the corresponding prior matrix.

According to an example embodiment, in a network that includes a plurality of base stations of which locations are not fixed, efficient beams may be simultaneously trained by matching a base station to an agent using multi-agent deep reinforcement learning.

When training a beam by matching a base station to each agent using multi-agent deep reinforcement learning, a deep reinforcement learning technique applicable to the above proposed high-density network may be developed. By assuming a base station of which a location is not fixed, a network with a high degree of freedom rather than a network between a user and a base station fixed in a specific form may be readily configured and then the network may be simulated in an environment of the proposed reinforcement learning technique at any time.

According to an example embodiment, beams between a plurality of base stations and a plurality of users are immediately designed using online reinforcement learning.

The conventional machine learning technique has been proposed as a technique capable of outputting beams suitable for various channels through a lot of prior learning. However, when a channel unfound in prior learning is input due to a great change in a communication environment, this method may not output a beam suitable for the corresponding channel. Online reinforcement learning according to an example embodiment may prevent the above event and may be in a structure of immediately learning a beam suitable for a new channel although the change occurs in the communication environment and may be more suitable since many learning processes, such as prior learning, are not required.

According to an example embodiment, proposed is a multi-agent deep reinforcement learning technique with low information exchange overhead between agents based on a simple state and action structure.

The conventional multi-agent deep reinforcement learning technique has suppressed divergency or instability of policy through limited information exchange between agents. The limited information exchange is required since a state and action structure is complex and signal overhead required to exchange all information is greatly consumed. In the proposed multi-agent deep reinforcement learning technique, information exchange between agents requires an action of another agent to calculate interference of a predicted transmission rate that is a reward of each agent. Here, since the state and action structure is very simple, more stable multi-agent reinforcement learning with small overhead consumption may be performed.

According to an example embodiment, a candidate beam is selected to reduce complexity of an action applied to deep reinforcement learning.

Codebook-based analog beamforming of a multi-antenna-based base station or user shows low efficiency and uses a longer training time for progress of learning since a beam is detailed and a size of a codebook is large. To prevent this, beams are selected to prevent highly correlated beam indices (e.g., beam pairs in the same row or column) that are expected to show high interference with prior knowledge. Here, a beam having the same row or column in a gain table as a previously selected beam is not overlappingly selected. A reduced state space and action space may be maintained based on beams selected in the above manner. Although the number of users increases, the above simulation results show that a data rate increases according to the number of users in the case of using a state space and an action space with a predetermined size.

Figure 4:
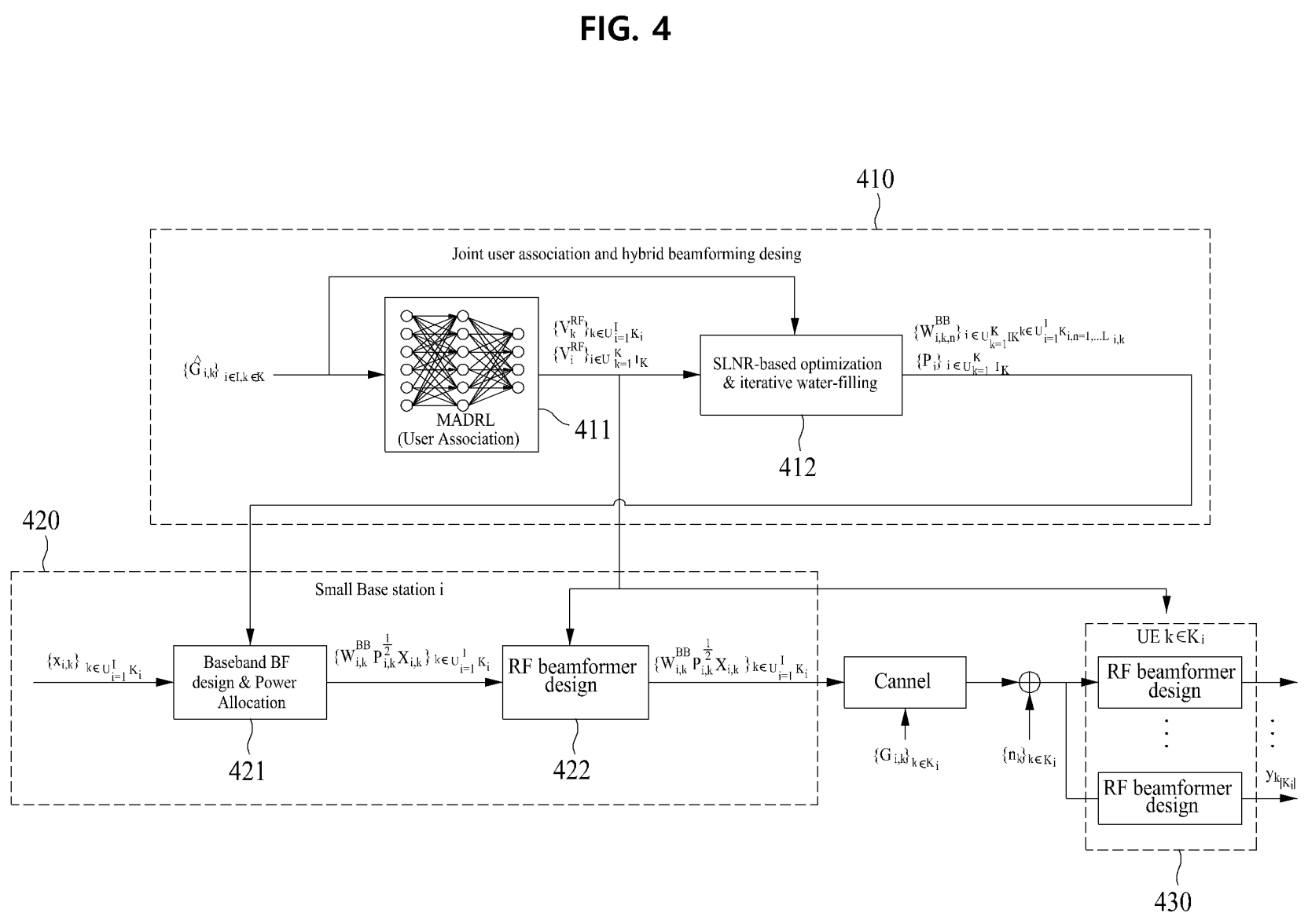

FIG. 4 illustrates an interference control and hybrid beamforming process using multi-agent deep reinforcement learning according to an example embodiment.

Initially, each parameter to explain a system model according to an example embodiment is described as below:

I: number of small base stations (SBSs)

K: number of users $N_S$: number of antennas of SBS $N_U$: number of antennas of user $a_S(\bullet)$: array response vector of SBS $a_U(\bullet)$: array response vector of user $G_{i,k}$: channel matrix between i-th SBS and k-th user $$G_{i,k}^{(L)}:$$

LOS component in channel matrix between i-th SBS and k-th user $$G_{i,k}^{(N)}:$$

non-LOS component in channel matrix between i-th SBS and k-th user $$\tilde{G}_{i,k}^{(L)}:$$

large-scale channel gain of LOS component by pathloss and shadowing $$\tilde{G}_{i,k}^{(N)}:$$

large-scale channel gain of non-LOS component by pathloss and shadowing $$N_{RF}^{(S)}:$$

number of RF chains of SBS $$N_{RF}^{(U)}:$$

number of RF chains of user $$P_S:$$

Tx power of SBS
$W_i$: Tx beamforming matrix of i-th SBS $$W_i^{RF}:$$

Tx analog beamforming matrix of i-th SBS $$W_i^{BB}:$$

Tx baseband beamforming matrix of i-th SBS
$P_i$: Tx power allocation matrix of i-th SBS
$V_k$: Rx beamforming matrix of k-th user $$V_k^{RF}:$$

Rx analog beamforming matrix of k-th user $$V_k^{BB}:$$

Rx baseband beamforming matrix of k-th user
$f_c$: center frequency
$J_i(\pi_i)$: objective function
$Q_\psi(s_t, a_t)$: expected discount gain $L_Q(\psi)$: loss function $$s_i^{(t)}:$$

state of i-th agent in time t $$a_i^{(t)}:$$

action of i-th agent in time t $$r_i^{(t)}:$$

reward of i-th agent in time t
$N_f$: number of candidate links
$L_{i,k}$: link between i-th SBS and k-th user
BW: bandwidth
$N_0$: noise power spectrum density
$[\cdot]^H$: conjugate transpose
$\mathbb{E}[\cdot]$: Expectation operator $$L_i^{(S)}:$$

total number of links used by i-th SBS
$\mathcal{K}_i$: total number of users supported by i-th SBS
$\mathcal{J}_k$: set of total SBSs connected to k-th user
$P_i$: Tx power allocation matrix of i-th SBS
$N_{tr}$: total number of dominant elements in channel selected for limited feedback Interference control and hybrid beamforming technology using the proposed multi-agent deep reinforcement learning refers to a method of controlling interference links present in a user-oriented high-density network in sub-THz band based on deep reinforcement learning and maximizes a data rate for the entire UEs by introducing multi-agent deep reinforcement learning for interference control having high complexity. In the case of applying deep reinforcement learning, complexity greatly increases to control all beamforming in the entire high-density network when using single-agent reinforcement learning and multi-agent reinforcement learning is applied accordingly. A two-stage hybrid beamforming design method is introduced. Here, in an operation of performing reinforcement learning, antenna gain is maximized through multi-agent reinforcement learning. In an operation of performing interference control and beamforming, an analog beamforming matrix pair corresponding to a link that reduces interference between users is searched for and a baseband beamforming matrix applies an SLNRR maximization technique.

In detail, operation 410 of performing reinforcement learning includes operation 411 of performing deep reinforcement learning using interference and antenna gain information that is expected based on a gain table designed using CSI of all users. A learning environment includes a single agent corresponding to each SBS.

In operation 420, an analog beamforming matrix pair corresponding to a link that maximizes antenna gain and minimizes interference between UEs through multi-agent reinforcement learning is searched for. Operation 420 includes operation 421, in operation 421, an SINR for each SBS that is predicted based on interference and antenna gain expected in the learning process is designed as a reward of each agent. In operation 422, a link selected so far from a candidate link set is defined as a state of a corresponding agent for each agent and a link selected in a current time interval is defined as an action of the agent. In operation 430, a link between an SBS and a UE that minimizes interference and maximizes antenna gain is searched for therefrom.

In an operation of performing interference control and beamforming, an SLNR maximization technique that minimizes the interference between the UEs is applied based on the link that is found in the aforementioned reinforcement learning performing operation (412). Also, Tx power for each link is optimized based on iterative water-filling.

Hereinafter, a sub-THz channel in a channel model of a downlink multi-user environment is described.

$$G_{i,k} = U_{i,k}\sqrt{\tilde{G}_{i,k}^{(L)}}\, G_{i,k}^{(L)} + \sqrt{\tilde{G}_{i,k}^{(N)}}\, G_{i,k}^{(N)},$$

$$G_{i,k}^{(L)} = \sqrt{N_U N_S}\, \alpha_{i,k,0} a_U(\phi_{i,k,0}^{(U)}, \theta_{i,k,0}^{(U)}) a_S^H(\phi_{i,k,0}^{(S)}, \theta_{i,k,0}^{(S)}),$$

$$G_{i,k}^{(N)} = \sqrt{\frac{N_U N_S}{N_p}} \sum_{p=1}^{N_p} \alpha_{i,k,p} a_U(\phi_{i,k,p}^{(U)}, \theta_{i,k,p}^{(U)}) a_S^H(\phi_{i,k,p}^{(S)}, \theta_{i,k,p}^{(S)}),$$

Characteristics of sub-THz band channel include the limited number of clusters and rays, high path attenuation, and the like. Parameters used in the above equations are as follows:

$U_{i,k}$: Bernoulli random variable $$\tilde{G}_{i,k}^{(L)}:$$

MIMO channel gain for LOS path $$\tilde{G}_{i,k}^{(N)}:$$

MIMO channel gain for NLOS path
$N_p$: number of NLOS path components
$\alpha_{i,k,p}$: complex Gaussian random variable
$\beta_L(\beta_N)$: pathloss index and log normal shadowing gain for LOS (NLOS) path
$d_{i,k}$: distance between i-th SBS and k-th
$U_{i,k}$ is 1 as a probability of $P_{LOS}(d_{i,k})$ and 0 as a probability of $$P_{LOS}(d_{i,k}),\ \tilde{G}_{i,k}^{(L)} = 1/g_0 d_{i,k}^{\beta_L} \mu_{i,k}^{(L)},$$

$$\tilde{G}_{i,k}^{(N)} = 1/g_0 d_{i,k}^{\beta_N} \mu_{i,k}^{(N)},\ \alpha_{i,k,p} \sim C\mathcal{N}(0,1),\ P_{LOS}(d) = 1,$$

and if d>18 m, it is modeled to $$P_{LOS}(d) = \frac{18}{d} + \exp\left(-\frac{d}{36}\right)\left(1 - \frac{18}{d}\right).$$

Hereinafter, in the channel model of the downlink multi-user environment, a signal model is described.

A signal received by the k-th user and a signal that passes through a receiver may be represented as follows:

$$z_k^{(U)} \sum_{i \in \mathcal{J}_k} \sum_{m \in \mathcal{K}_i} G_{i,k} W_i^{RF} W_{i,m}^{BB} P_{i,m}^{\frac{1}{2}} x_{i,m}^{(s)} + \sum_{j \neq \mathcal{J}_k} \sum_{m \in \mathcal{K}_j} G_{j,k} W_j^{RF} W_{j,m}^{BB} P_{j,m}^{\frac{1}{2}} x_{j,m}^{(S)} + n_k^{(U)}$$

$$y_k^{(U)} = V_k^H \sum_{i \in \mathcal{J}_k} \sum_{m \in \mathcal{K}_i} G_{i,k} W_i^{RF} W_{i,m}^{BB} P_{m,i}^{\frac{1}{2}} x_{i,m}^{(S)} +$$

$$V_k^H \sum_{j \neq \mathcal{J}_k} \sum_{m \in \mathcal{K}_j} G_{j,k} W_j^{RF} W_{j,m}^{BB} P_{j,m}^{\frac{1}{2}} x_{j,m}^{(S)} + V_k^H n_k^{(U)},$$

Here, the user does not implement a baseband beamforming matrix in a hybrid beamforming matrix. Also, $$W_i^{RF} \in \mathbb{C}^{N_S \times N_{RF}^{(S)}},\ V_k = V_k^{RF} V_k^{BB} \in \mathbb{C}^{N_U \times L_k^{(U)}},$$

$$W_i^{BB} = [\cdots |W_{i,k}^{BB}| \cdots],\ P_{i,k} = \text{diag}(p_{i,k,1}, \ldots, p_{i,k,L_{i,k}}),$$

and $\text{Tr}(P_i) \leq P_S$. $p_{i,k,n}$ denotes Tx power that supports a stream of an n-th link.

In the above signal, $$W_i^{RF} \text{ and } V_k^{RF}$$

include only an nr phase shifter.

Orthogonal beamforming vectors are used to configure $$W_i^{RF} = \left[ w_{i,1}^{RF} | \ldots | w_{i,L_i^{(S)}}^{RF} \right] \text{ and } V_k^{RF} = \left[ v_{k,1}^{RF} | \ldots | v_{k,L_k^{(U)}}^{RF} \right]$$

that are analog beamforming matrices.

A baseband beamforming matrix in an SBS is differently configured for each connected user, $$W_{i,k}^{BB} = \left[ w_{i,k,1}^{BB}, w_{i,k,2}^{BB}, \ldots, w_{i,k,L_{i,k}}^{BB} \right], \text{ and } w_{i,k,n}^{BB}$$

denotes a baseband beamforming column vector that supports the steam of the n-th link.

Hereinafter, design of a hybrid beamforming matrix for data rate maximization and design of a link configuration optimization problem between an SBS and a user will be described.

An SINR for each of $L_{i,k}$ links between the i-th SBS and the k-th UE from the signal received by the k-th user may be expressed as follows:

$$SINR_{i,k,n}^{UE} = \frac{p_{i,k,n} \left| v_{k,n_i}^H G_{i,k} W_i^{RF} w_{i,k,n}^{BB} \right|^2}{\left\| v_{k,n_i} \right\|^2 P_n^U + P_{I_A}^{(i,k,n)} + P_{I_B}^{(i,k,n)} + P_{I_C}^{(i,k,n)}},$$

$$P_{I_A}^{(i,k,n)} = \sum_{\substack{l=1, \\ l \neq n}}^{L_{i,k}} p_{i,k,l} \left| v_{k,n_i}^H G_{i,k} W_i^{RF} w_{i,k,l}^{BB} \right|^2,$$

$$P_{I_B}^{(i,k,n)} = \sum_{\substack{m \in \mathcal{K}_i, \\ m \neq k}} \sum_{l=1}^{L_{i,m}} p_{i,m,l} \left| v_{k,n_i}^H G_{i,k} W_i^{RF} w_{i,m,l}^{BB} \right|^2,$$

$$P_{I_C}^{(i,k,n)} = \sum_{\substack{j=1, \\ j \neq i}}^{I} \sum_{m \in \mathcal{K}_j} \sum_{l=1}^{L_{j,m}} p_{j,m,l} \left| v_{k,n_i}^H G_{j,k} W_j^{RF} w_{j,m,l}^{BB} \right|^2,$$

Here, $v_{k,n_i}$ denotes an $n_i$-th column vector in an analog beamforming matrix used for connection between the k-th UE and the i-th SBS.

A total of I SBSs simultaneously transmit signals to UEs of links connected to the SBSs. Each SBS applies a hybrid beamforming matrix and the UE applies an analog beamforming matrix in which baseband beamforming is not applied. Here, interference between links connected to UEs is defined as $P_{I_A}$, interference between UEs occurring by opening, by an SBS connected to the UEs, a link with the other UEs and by transmitting a stream is defined as $P_{I_B}$, and interference from another SBS is defined as $P_{I_C}$.

$$P_n^U$$

denotes noise power of the UEs.

A sum of data rates of the entire network may be calculated based on SINRs of all links designed in the network, as follows:

$$R = \sum_{i=1,\, k \in \mathcal{K}_i}^{I} \sum_{n=1}^{L_{i,k}} \log_2\left(1 + SINR_{i,k,n}^{UE}\right)$$

Based on this, a data rate optimization problem may be defined as follows.

$$\max_{\substack{W_i^{RF}, W_i^{BB}, P_i, \\ V_k^{RF}, V_k^{BB}, L_{i,k}, \forall i,k}} \sum_{i \in \mathcal{J}} \sum_{k \in \mathcal{K}_i} \sum_{n=1}^{L_{i,k}} \log_2\left(1 + SINR_{i,k,n}^{UE}\right)$$

$$\text{s.t. } Tr(P_i) \le P_S, \ \forall \ i,$$

$$\left\| W_i^{RF} w_{i,k,n}^{BB} \right\|_2^2 = 1, \ \forall \ i \in \mathcal{J}, \ k \in \mathcal{K}_i, \ n = 1, \dots, L_{i,k}.$$

$$\left| \left[ W_i^{RF} \right]_{p,q} \right| = \frac{1}{\sqrt{N_S}}, \ \left| \left[ V_k^{RF} \right]_{p,q} \right| = \frac{1}{\sqrt{N_U}}$$

$$0 \le L_i^{(S)} \le N_{RF}^{(S)}, \ \forall \ i, \text{ and } 0 \le L_k^{(U)} \le N_{RF}^{(U)}, \ \forall \ k$$

First and second constraints are related to a Tx power constraint of each SBS, a third constraint is related to a constraint of analog beamforming, and a last constraint is required since the number of streams transmittable by each SBS or UE through the entire links is not allowed to exceed the number of RF chains.

A method of reducing signal overhead through limited CSI obtainment according to an example embodiment is described.

When it is assumed that all channel information between an SBS and a UE is transmitted, signal overhead concentrated on an MBS in a high-density network significantly increases and thus, it needs to be prevented.

To reduce signal overhead toward the MBS, only a portion of the entire channel constituent components are transmitted.

$$G_{i,k} = \sum_{n=1}^{N_U} \sum_{m=1}^{N_S} [\overline{G}_{i,k}]_{n,m} a_U\left(\overline{u}_n^U, \overline{v}_n^U\right) a_S^H\left(\overline{u}_m^S, \overline{v}_m^S\right),$$

$$\hat{G}_{i,k} = \sum_{n=1}^{N_U} \sum_{m=1}^{N_S} [\hat{G}_{i,k}]_{n,m} a_U\left(\overline{u}_n^U, \overline{v}_n^U\right) a_S^H\left(\overline{u}_m^S, \overline{v}_m^S\right),$$

$$\left(\overline{u}_n^U, \overline{v}_n^U\right)$$

denotes a prior angle that is pre-designed such that response vectors of $N_U$ SBSs are orthogonal to each other and $$\left(\overline{u}_m^S, \overline{v}_m^S\right)$$

is designed in a similar manner. $[\overline{G}_{i,k}]_{n,m}$ corresponds to channel gain that may be obtained when using an n-th prior response vector of an SBS and an m-th prior response of a UE. Here, if most dominant $N_{rr}$ components are used among channel gain components, a second equation may be obtained.

In the aforementioned data rate optimization problem, an analog beamformer of an SBS and a UE is configured as a prior matrix in a beam direction of a designed link. For example, when a link is designed in a direction of $$\left(\overline{u}_n^U, \overline{v}_n^U\right), \left(\overline{u}_m^S, \overline{v}_m^S\right)$$

between the i-th SBS and the k-th UE, $$a_U\left(\overline{u}_n^U, \overline{v}_n^U\right) \text{ and } a_S\left(\overline{u}_m^S, \overline{v}_m^S\right)$$

are included as columns of analog beamformer to be applied to the i-th SBS and the k-th UE, respectively.

When a link is determined, an analog beamformer in a corresponding beam direction is determined and thus, an index of the link is assumed as an index of a prior matrix of the analog beamformer. For example, when an n-th prior response vector, such as $$a_U\left(\overline{u}_n^U, \overline{v}_n^U\right),$$

is selected, an index of the corresponding link is assumed as n.

A method of controlling interference between links using multi-agent deep reinforcement learning according to an example embodiment is described.

In a multi-agent deep reinforcement learning system environment, an MBS designs a channel gain table of all SBS-UE pairs based on limited channel information obtained from all UEs as follows.

$$\begin{bmatrix} \hat{G}_{1,1}^T & \hat{G}_{1,2}^T & \dots & \hat{G}_{1,K}^T \\ \vdots & \vdots & \ddots & \vdots \\ \hat{G}_{I,1}^T & \hat{G}_{I,2}^T & \dots & \hat{G}_{I,K}^T \end{bmatrix}$$

$$\left[ \hat{G}_{1,1}^T, \hat{G}_{1,2}^T, \dots, \hat{G}_{1,K}^T \right]$$

represents channel gain information between a first SBS and all UEs in the above gain table.

I agents to design a pair of an analog beamforming matrix of each SBS and an analog beamforming matrix of a UE to connect to the corresponding SBS are present in the MBS.

The corresponding agents perform learning simultaneously with other agents in a virtual network that is designed based on the gain table of the MBS.

An i-th agent selects total $N_f$ candidate links from $$\left[\hat{G}_{i,1}^{T}, \hat{G}_{i,2}^{T}, \dots, \hat{G}_{i,K}^{T}\right].$$

For example, a candidate link selection method of the i-th agent is as follows:

A largest element is selected from $$\left[\hat{G}_{i,1}^{T}, \hat{G}_{i,2}^{T}, \dots, \hat{G}_{i,K}^{T}\right].$$

If the corresponding element is present at location (n, m) within a matrix after the selection, all elements located in an n-th row and an m-th column are processed as 0 to minimize interference.

Through the above process, if all of $N_f$ candidate links are selected or if all elements in $$\left[\hat{G}_{i,1}^{T}, \hat{G}_{i,2}^{T}, \dots, \hat{G}_{i,K}^{T}\right]$$

are zeroes, the above process is terminated.

A process of removing an element located in the same row or column as that of the selected element may prevent an unnecessary learning process.

A Markov decision process, an episode, and a time interval structure according to an example embodiment are described.

All agents learn a link configuration that maximizes a data rate through a trial-and-error method from a predetermined number of episodes and time intervals within the episodes.

Each episode includes the number of time intervals corresponding to the number of RF chains. Every time an episode starts, a state and an action of each agent are initialized to a zero vector. The Markov decision process within reinforcement learning defines forms of a state, an action, and a reward of each agent and defines a transition process from a current state to another state. The Markov decision process within reinforcement learning is defined as follows:

$$s_i^{(t)} \in \{0,1\}^{N_{RF}^{(S)}}$$

$$a_i^{(t)} \in \{0,1\}^{N_{RF}^{(S)}}$$

A current selected link is defined as a state of a corresponding agent for each agent.

A link to be selected in a corresponding time interval is defined as an action of a corresponding agent for each agent.

A sum of data rates obtainable from links selected from a corresponding time interval to a current time interval of an SBS related to a corresponding agent is defined as a reward for each agent:

$$r_i^{(t)} = \sum_{k \in K_i} \sum_{n \in S_i} \log_2\left(1 + SINR_{i,k,n}^{UE}\right)$$

For, if $$N_f = 3, N_{RF}^{(S)} = 2,$$

a state vector may be defined as [0,0,0], [0,0,1], [0,1,0], [1,0,0], [0,1,1], [1,1,0], [1,0,1], and an action vector may be defined as [0,0,0], [0,0,1], [0,1,0], [1,0,0].

When a state and an action are configured as binary vectors as above and a single link is selected in a single time interval, similar states may have high correlation and reinforcement learning that includes a stochastic actor, such as soft actor-critic (SAC), is highly likely to converge to a state having high correlation with an optimal state.

Most deep reinforcement learning is designed based on a deep neural network. Here, in the case of using a fully connected layer in the deep neural network, there is a high probability that adjacent nodes of the neural network have similar weights. In this case, it is advantageous to configure states having similar correlation to approximate to a relationship between nearby nodes in the deep neural network in consideration of correlation between adjacent nodes.

Taking, as an example, a portion of binary vectors in $$N_f = 7, N_{RF}^{(S)} = 4$$

of any one SBS, states of [0,0,1,1,1,1,0] and [0,0,1,1,1,0,0] have high correlation and are highly likely to have similar predicted data rates. Also, since an input and an output of the deep neural network are a state and an action, the proposed structure is a structure that considers correlation for each node of input and output neural layers.

A reward of each agent is defined as a sum of data rates obtainable for each SBS from links selected up to a current time interval. If the number of links that support the same UE exceeds the number of RF chains of the UE, or if a beam $(a_U(\cdot))$ on a UE side that connects a link is the same as a beam on a UE side of a link selected in a previous time interval, a stream is not transmitted to a link from which low channel gain is obtained for interference control.

A state transition process of the i-th agent is defined as follows according to definition of the state and the action as above:

$$s_i^{(t+1)} = s_i^{(t)} + a_i^{(t)} \quad \forall i$$

Here, + corresponds to a binary or operation for each vector element.

| A | B | X |
|---|---|---|
| 0 | 0 | 0 |
| 0 | 1 | 1 |
| 1 | 0 | 1 |
| 1 | 1 | 1 |

In a reinforcement learning technique Soft Actor-Critic (SAC) applied herein, each agent searches for a state that generates an optimal reward based on a state in a discrete state space and an action in a discrete action space using an SAC technique that is one of policy-based learning methods.

Here, a loss function is defined as follows:

$$L_Q(\psi) = \sum_{i=1}^{N} E_{s,a,r,s'\sim D}\left[\left(Q_i^{\psi}(s_i, a_i) - y_i\right)^2\right]$$

s', a' denote a state and an action in a time interval after s, a, respectively.

$$y_i = r_i(s_i, a_i) + \gamma E_{a_i' \sim \pi_i'(s_i')}\left[\overline{Q_1}(s_i', a_i') - \alpha \log\left(\pi_{\overline{\theta}}(a_i' \mid s_i')\right)\right],$$

$\overline{\psi}$ denotes a parameter of a target critic, $\pi_i$ denotes an updated policy in a next time interval, and $\pi_{\overline{\theta}}$ denotes a parameter of a target actor.

In baseband beamforming and power allocation according to an example embodiment, baseband beamforming is designed to maximize an SLNR optimization problem.

$$SLNR_{i,k,n} = \frac{p_{i,k,n}\left|\left(v_{k,n_i}^{RF}\right)^H G_{i,k} W_i^{RF} w_{i,k,n}^{BB}\right|^2}{P_n^U + P_L}$$

Here, total leakage power is given as follows:

$$P_L = p_{i,k,n}\sum_{\substack{l=1,\\l\neq n_i}}^{L_k^{(U)}}\left|\left(v_{k,i}^{RF}\right)^H G_{i,k} W_i^{RF} w_{i,k,n}^{BB}\right|^2 +$$

$$p_{i,k,n}\sum_{\substack{m\in\mathcal{K},\\m\neq k}}\sum_{l=1}^{L_m^{(U)}}\left|\left(v_{m,l}^{RF}\right)^H G_{i,m} W_i^{RF} w_{i,k,n}^{BB}\right|^2$$

Dissimilar to the existing SINR optimization problem, the above problem for maximizing an SLNR for each link has a solution in a closed form as follows:

$$w_{i,k,n}^{BB} = c_{i,k,n}\left(\left(W_i^{RF}\right)^H A_{i,k,n} W_i^{RF}\right)^{-1}\left(W_i^{RF}\right)^H \hat{G}_{i,k}^H v_{k,n_i}^{RF}$$

The above constant $c_{i,k,n}$ denotes a normalization variable to satisfy a power transmission constraint of a data rate optimization problem.

In the case of power allocation, an optimal power allocation ratio is searched for each link by solving the following power allocation problem.

$$\max_{P_i \geqslant 0, \forall i}\sum_{i\in\mathcal{J}}\sum_{k\in\mathcal{K}_i}\zeta_k\sum_{n=1}^{L_{i,k}}\log_2\left(1 + SINR_{i,k,n}^{UE}\right)$$

$$\text{s.t. } Tr(P_i) \leq P_S, \forall i.$$

Since the above problem is non-convex, an iterative water filling method is introduced.

Initially, the above power allocation problem is expressed as a Lagrange function.

$$\overline{L}(p) = \sum_{i\in\mathcal{J}}\sum_{k\in\mathcal{K}_i}\sum_{n=1}^{L_{i,k}}\log_2\left(1 + SINR_{i,k,n}^{UE}\right) -$$

$$\sum_{i\in\mathcal{J}}\overline{\lambda}_i\left(\sum_{k\in\mathcal{K}_i}\sum_{n=1}^{L_{i,k}}p_{i,k,n} - P_S\right),$$

Here, $\overline{\lambda}_i$ denotes a Lagrange multiplier and $$p \triangleq [\ldots, p_{i,k,n}, \ldots]^T, i \in \mathcal{J}, k \in \mathcal{K}, n = 1, \ldots, L_{i,k}.$$

Then, a local optimal solution is found using the following two conditions among Karush-Kuhn-Tucker (KKT) conditions.

$$\frac{\partial \overline{L}(p)}{\partial p_{i,k,n}} = 0,$$

$$p_{i,k,n} \geq 0.$$

The solution is arranged in the following form.

$$p_{i,k,n} = \left[\frac{\zeta_k}{c_{i,k,n}(p) + \sum_{j\in I}\overline{\lambda}_j\log 2} - \frac{g_{i,k,n}(p)}{a_{i,k,n}}\right]^+$$

Here, $e_{i,k,n}(p)$ is given as follows:

$$e_{i,k,n}(p) \triangleq \sum_{j\in I}\sum_{m\in\mathcal{K}_j}\sum_{l=1}^{L_{j,m}}\frac{p_{j,m,l}a_{j,m,l}b_{j,m,l}^{(i,k,n)}}{g_{j,m,l}^2(p) + p_{j,m,l}a_{j,m,l}f_{j,m,l}(p)} - \frac{p_{i,k,n}a_{i,k,n}b_{i,k,n}^{(i,k,n)}}{g_{i,k,n}^2(p) + p_{i,k,n}a_{i,k,n}f_{i,k,n}(p)},$$

$$a_{i,k,n} \triangleq \left|\left(v_{k,n_i}^{RF}\right)^H \hat{G}_{i,k} W_i^{RF} w_{i,k,n}^{BB}\right|^2, b_{i,k,n}^{(j,m,l)} \triangleq \left|\left(v_{k,n_i}^{RF}\right)^H \hat{G}_{i,k} W_j^{RF} w_{j,m,l}^{BB}\right|^2, \text{ and}$$

$$f_{i,k,n}(p) \triangleq P_n^U + P_{I_A}^{(i,k,n)} + P_{I_B}^{(i,k,n)} + P_{I_C}^{(i,k,n)}.$$

$p_{i,k,n}$, $e_{i,k,n}(p)$, $f_{i,k,n}(p)$ is repeated until the above two KKT conditions are satisfied or the maximum number of iterations is reached.

Figure 5:
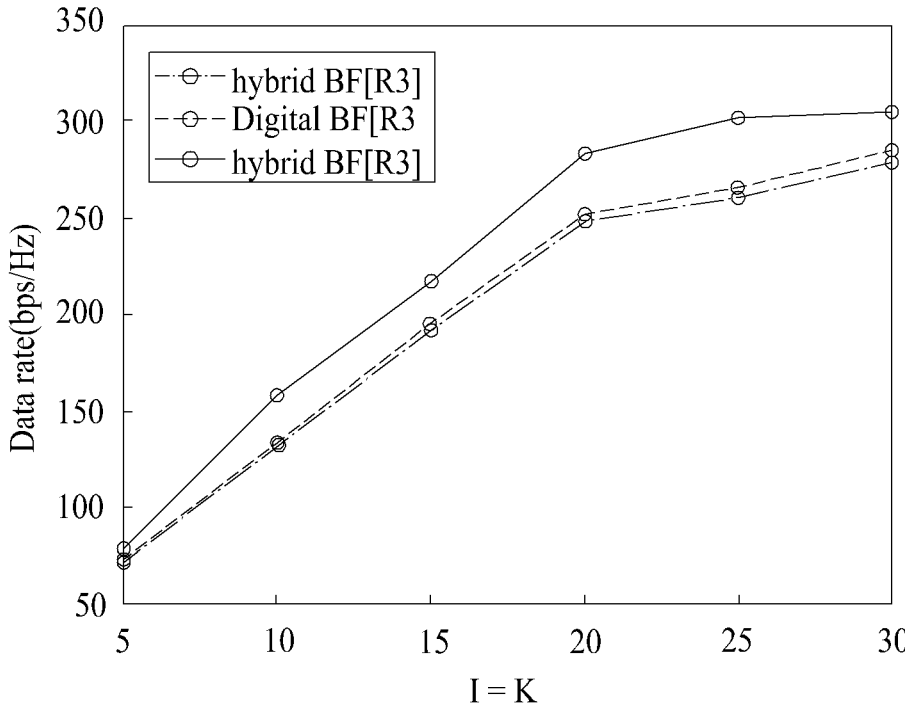
FIG. 5 is a graph showing simulation results according to an example embodiment.

FIG. 5 is a graph showing simulation results according to an example embodiment.

A data rate of a user-centric network is maximized based on a link configuration method obtained after a reinforcement learning process is completed and a hybrid beamformer corresponding thereto.

To verify a data rate obtainable when a link of a designed network considers a previously assumed overhead, an overhead model and a sum of data rate are assumed as performance indicators.

The overhead model may be configured with overhead ($N_{tr}$) occurring when each UE predicts a channel corresponding to each of all links connected to different SBSs, overhead ($T_{fb}$) occurring when transmitting $N_{tr}$ dominant channel elements to an MBS, and overhead ($T_{ff}$) occurring when transmitting an index of a corresponding link to each SBS and UE after a reinforcement learning process is terminated, and a sum of data rates obtainable when considering overhead is as follows:

$$R[\text{bps/Hz}] = \left(1 - \frac{T_{tr} + T_{fb} + T_{ff}}{T_c}\right)\sum_{k=1}^{K} R_k[\text{bps/Hz}]$$

-continued $$T_{tr} = 1600 \times I \text{ symbols,}$$

$$T_{fb} = \mu B_{fb} = \mu(2QN_{p_r}IK + \lceil \log_2 N_S N_U \rceil N_{tr}IK) \text{ symbols,}$$

$$T_{ff} = \mu B_{ff} = \mu\left(\sum\nolimits_{i,k} L_{i,k}(\lceil \log_2 N_U \rceil + \lceil \log_2 N_S \rceil)\right) \text{ symbols,}$$

$$T_c = 0.3 \times 10^6 \text{ symbols.}$$

Here, $\mu$ denotes a transformation coefficient between a bit and a symbol and is assumed as 1 since binary phase shift keying (BPSK) is assumed and Q denotes the number of bits required to convert a scalar value to a bit.

In a user-centric network, each SBS and each UE are arranged in a sector with the radius of 50 m and the range of 120 degrees by applying a Poisson process.

Parameters required for a network configuration are set as follows:

| Parameter | Value | Parameter | Value |
|---|---|---|---|
| Network radius | 50 m | Number of SBS antennas | $N_S = 144$ |
| Center frequency | $f_c = 140$ GHz | Number of SBS RF chains | $N_{RF}^{(S)} = 4$ |
| Bandwidth | BW = 2 GHZ | Number of UE antennas | $N_U = 36$ |
| Noise index | NF = 8 dB | Number of UE RF chains | $N_{RF}^{(U)} = 4$ |
| Noise power density | $N_0 = -174$ dBm/Hz | SBS Tx power constraint | $P_S = 30$ dBm |
| Number of NLOS paths | $N_p = 4$ | Number of channel feedbacks | $N_{tr} = 2$ |

Environment parameters within multi-agent deep reinforcement learning are set as follows.

| Parameter | Value |
|---|---|
| Discount rate | 0.99 |
| Learning rate | 0.00005 |
| | 16000 |
| Mini-batch size | 60 |
| Number of hidden layer nodes in policy network | 128 |
| Number of hidden layer nodes in critic network | 128 |
| Length of state vector for each agent (=$N_f$) | 20 |
| Length of state vector for each agent(=$N_f$ + 1) | 21 |

Simulation results of FIG. 5 show that a sum of data rates obtained from the proposed link configuration method using multi-agent deep reinforcement learning is higher than that of the link configuration method of related art [3]. That is, the proposed art more efficiently controls interference between links.

Also, although the number of I SBSs and K UEs increases up to 30, a data rate based on multi-agent reinforcement learning is higher than that of the link configuration method of related art [3].

Also, despite that lengths of a state space and an action vector are limited to $N_f$ and $N_f$+1, it can be verified that a data rate increases according to an increase in the number of users. This may be analyzed as results according to an increase in the number of selectable high-gain beams and a degree of freedom of a beam selection method capable of avoiding interference according to an increase in the number of users.

The systems and/or apparatuses described herein may be implemented using hardware components, software components, and/or a combination thereof. For example, apparatuses and components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to the example embodiments may be recorded in non-transitory computer-readable media including program instructions to implement various operations embodied by a computer. Also, the media may include, alone or in combination with the program instructions, data files, data structures, and the like. Program instructions stored in the media may be those specially designed and constructed for the example embodiments, or they may be well-known and available to those having skill in the computer software arts. Examples of non-transitory computer-readable media include magnetic media such as hard disks, floppy disks, and magnetic tapes; optical media such as CD ROM disks and DVDs; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method for interference control and hybrid beamforming, the method comprising:

performing multi-agent reinforcement learning using interference and antenna gain information that is expected based on a gain table designed using channel state information (CSI) of all user equipments;

searching for an analog beamforming matrix pair corresponding to a link that maximizes antenna gain and minimizes interference between user equipments through multi-agent reinforcement learning;

applying a signal-to-leakage plus noise ratio (SLNR) maximization technique that minimizes the interference between the user equipments based on the link; and optimizing transmission (Tx) power for each link based on iterative water-filling, wherein the performing of the multi-agent reinforcement learning using the interference and antenna gain information comprises designing, as a reward of each agent, a signal-to-interference plus noise ratio (SINR) for each small base station (SMS) that is predicted based on interference and antenna gain that is expected in a process of the multi-agent reinforcement learning performed for a plurality of agents corresponding to each SBS for the multi-agent reinforcement learning, and wherein the performing of the multi-agent reinforcement learning using the interference and antenna gain information comprises learning a link configuration that maximizes a data rate through a trial-and-error method from a predetermined number of episodes and time intervals within the episodes for all agents.

2. The method of claim 1, wherein the searching for the analog beamforming matrix pair comprises defining a link selected so far from a candidate link set as a state of a corresponding agent for each agent, defining a link selected in a current time interval, as an action of the agent, and defining a sum of data rates obtained from links selected so far of an SBS related to the agent in a corresponding time interval for each agent as a reward of the agent.

3. The method of claim 2, wherein the searching for the analog beamforming matrix pair comprises searching for a link between the SBS and the user equipment that minimizes interference for the selected links and maximizes antenna gain by constructing the state of the agent and the action of the agent as a binary vector.

4. The method of claim 1, wherein the applying of the SLNR maximization technique comprises allowing each SBS to apply a hybrid beamforming matrix and allowing the user equipment to apply an analog beamforming matrix to which baseband beamforming is not applied, and, when a plurality of SBSs simultaneously transmit signals to user equipments of links connected to the plurality of SBSs, obtaining a sum of data rates of the entire network based on an SINR of all links according to interference between links connected to the user equipment, interference between the user equipment and another user equipment that occurs by opening, by an SBS connected to the user equipment, a link with the other user equipment and by transmitting a stream, and interference from other SBSs, and optimizing a beamforming matrix pair and a link configuration between the SBS and the user equipment for data rate maximization using the sum of data rates.

5. The method of claim 1, wherein the multi-agent reinforcement learning is capable of outputting a beam according to a change in a communication environment or a change in channel input by immediately designing beams between a plurality of SBSs and a plurality of user equipments using online reinforcement learning.

6. The method of claim 1, wherein the multi-agent reinforcement learning assumes a plurality of SBSs of which locations are not fixed in a UM-MIMO network and increases a degree of freedom and efficiency of the multi-agent reinforcement learning by simultaneously learning beams by allowing a plurality of SBSs to correspond to the plurality of agents.

7. A method for interference control and hybrid beamforming, the method comprising:

performing multi-agent reinforcement learning using interference and antenna gain information that is expected based on a gain table designed using channel state information (CSI) of all user equipments;

searching for an analog beamforming matrix pair corresponding to a link that maximizes antenna gain and minimizes interference between user equipments through multi-agent reinforcement learning;

applying a signal-to-leakage plus noise ratio (SLNR) maximization technique that minimizes the interference between the user equipments based on the link; and optimizing transmission (Tx) power for each link based on iterative water-filling, wherein the applying of the SLNR maximization technique comprises reducing signal overhead through limited CSI obtainment by transmitting a portion of the entire channels according to channel gain between an SBS and the user equipment and by using an index of the link as an index within a pre-input prior matrix of an analog beamformer to prevent signal overhead for a macro base station (MBS) in an ultra massive multiple input multiple output (UM-MIMO) network.

8. The method of claim 7, wherein the applying of the SLNR maximization technique further comprises:

allowing a plurality of agents present in the MBS to simultaneously perform learning with other agents within a virtual network that is designed based on a gain table of the MBS; and selecting a plurality of candidate links within each agent and when links with matching rows or columns in the gain table are present among candidate links selected by each of the agents, selecting a link having largest channel gain information and unselecting remaining candidate links from among candidate links selected by each agent within the gain table of the MBS.

9. A method for interference control and hybrid beamforming, the method comprising:

performing multi-agent reinforcement learning using interference and antenna gain information that is expected based on a gain table designed using channel state information (CSI) of all user equipments;

searching for an analog beamforming matrix pair corresponding to a link that maximizes antenna gain and minimizes interference between user equipments through multi-agent reinforcement learning;

applying a signal-to-leakage plus noise ratio (SLNR) maximization technique that minimizes the interference between the user equipments based on the link; and optimizing transmission (Tx) power for each link based on iterative water-filling) A system for interference control and hybrid beamforming, the system comprising:

a learning unit configured to perform multi-agent reinforcement learning using interference and antenna gain information that is expected based on a gain table designed using channel state information (CSI) of all user equipments; and an interference control and beamforming performer configured to search for an analog beamforming matrix pair corresponding to a link that maximizes antenna gain and minimizes interference between user equipments through multi-agent reinforcement learning, to apply a signal-to-leakage plus noise ratio (SLNR) maximization technique that minimizes the interference between the user equipments based on the link, and to optimize transmission (Tx) power for each link based on iterative water-filling, wherein the learning unit is configured to design, as a reward of each agent, a signal-to-interference plus noise ratio (SINR) for each small base station (SMS) that is predicted based on interference and antenna gain that is expected in a process of the multi-agent reinforcement learning performed for a plurality of agents corresponding to each SBS for the multi-agent reinforcement learning, wherein the learning unit is configured to learn a link configuration that maximizes a data rate through a trial-and-error method from a predetermined number of episodes and time intervals within the episodes for all agents.

10. The system of claim 9, wherein the interference control and beamforming performer is configured to define a link selected so far from a candidate link set as a state of a corresponding agent for each agent, to define a link selected in a current time interval, as an action of the agent, and to define a sum of data rates obtained from links selected so far of an SBS related to the agent in a corresponding time interval for each agent as a reward of the agent.

11. The system of claim 10, wherein the interference control and beamforming performer is configured to search for a link between the SBS and the user equipment that minimizes interference for the selected links and maximizes antenna gain by constructing the state of the agent and the action of the agent as a binary vector.

12. The system of claim 9, wherein the interference control and beamforming performer is configured to allow each SBS to apply a hybrid beamforming matrix and to allow the user equipment to apply an analog beamforming matrix to which baseband beamforming is not applied, and, when a plurality of SBSs simultaneously transmit signals to user equipments of links connected to the plurality of SBSs, to obtain a sum of data rates of the entire network based on an SINR of all links according to interference between links connected to the user equipment, interference between the user equipment and another user equipment that occurs by opening, by an SBS connected to the user equipment, a link with the other user equipment and by transmitting a stream, and interference from other SBSs, and to optimize a beamforming matrix pair and a link configuration between the SBS and the user equipment for data rate maximization using the sum of data rates.

13. The system of claim 9, wherein the interference control and beamforming performer is configured to reduce signal overhead through limited CSI obtainment by transmitting a portion of the entire channels according to channel gain between an SBS and the user equipment and by using an index of the link as an index within a pre-input prior matrix of an analog beamformer to prevent signal overhead for a macro base station (MBS) in an ultra massive multiple input multiple output (UM-MIMO) network.

14. The system of claim 13, wherein the interference control and beamforming performer is configured to allow a plurality of agents present in the MBS to simultaneously perform learning with other agents within a virtual network that is designed based on a gain table of the MBS, and to select a plurality of candidate links within each agent and when links with matching rows or columns in the gain table are present among candidate links selected by each of the agents, select a link having largest channel gain information and unselect remaining candidate links from among the candidate links selected by each agent within the gain table of the MBS.

15. The system of claim 9, wherein the interference control and beamforming performer is configured to be capable of outputting a beam according to a change in a communication environment or a change in channel input by immediately designing beams between a plurality of SBSs and a plurality of user equipments using online reinforcement learning, and to assume a plurality of SBSs of which locations are not fixed in a UM-MIMO network and to increase a degree of freedom and efficiency of the multi-agent reinforcement learning by simultaneously learning beams by allowing a plurality of SBSs to correspond to the plurality of agents.

* * * * *